Patented Mar. 15, 1932

1,849,124

UNITED STATES PATENT OFFICE

EDOUARD URBAIN, OF PARIS, FRANCE, ASSIGNOR, BY MESNE ASSIGNMENTS, TO COMPAGNIE DES PRODUITS CHIMIQUES ET CHARBONS ACTIFS ED. URBAIN, OF PARIS, FRANCE, A CORPORATION OF FRANCE

PROCESS OF PRODUCING PHOSPHORIC ACID

No Drawing. Application filed April 21, 1927, Serial No. 185,662, and in France December 7, 1926.

The present invention relates primarily to a process which in its entirety is directed to obtaining products of value from phosphate rock, but certain phases of the process will have other and broader applications.

As related to phosphate rock, the first phase of the invention consists in treating phosphorus rock together with other basic ingredients and carbon in such a way that a mixture of phosphorus vapor and carbon monoxide is obtained which may be somewhat diluted with other inert gases. As an incident to this phase of the process, I may obtain active carbon and calcium sulphate or a slag having the composition of quick-setting cement.

In the second phase of the process the foregoing mixture of gases and vapors is subjected to the action of steam under such conditions that the phosphorus is oxidized to form phosphoric acid which is separated out, and hydrogen is added to the gas mixture. At the same time, substantially none of the carbon-monoxide is oxidized, so that as a result of the second phase of the operation, I obtain commercially pure phosphoric acid well adapted for many purposes such as the manufacture of ammonium phosphate and a mixture of carbon-monoxide and hydrogen, which is very valuable for various synthetic processes such for example as the manufacture of methanol.

In the first part of the process the $PO_4$ radical contained in the phosphate rock (tricalcium phosphate) is caused to react with carbon containing substances under conditions which will prevent the extensive formation of $CO_2$. This may be done either indirectly or directly as is illustrated by the two following examples:

(1) Phosphate rock is treated with sulphuric acid to produce calcium sulphate and crude phosphoric acid. The phosphoric acid is then heated to a high temperature in the presence of carbon containing material without admission of substantial quantities of oxygen, until there is an evolution of phosphorus. This stage of the process is preferably conducted in the manner described in my earlier Patent No. 1,610,399, dated December 14, 1926, whereby there is obtained active carbon adapted for absorption or decolorizing work, and vapors of phosphorus mixed with carbon-monoxide.

(2) For the direct method, the phosphate rock may be heated in the presence of carbon to which I prefer to add silica and alumina (bauxite) or a mixture of alumina and clay. Sufficient carbon must be present to produce the reaction $P_2O_5 + 5C = 2P + 5CO$. If the production is conducted in an electric furnace, the exact amount of carbon for the reaction is all that need be added, though a small excess will do no harm as it can readily be burned out by admitting air to the furnace after the evolution of phosphorus has ceased. On the other hand, if the reaction is conducted in an ordinary vertical furnace, additional carbon should be added sufficient so it can be burned to heat the charge to a temperature of about 1600° C. (which is an economical temperature to use though it may be varied within wide limits) and supply the calories necessary for the aforesaid reaction. The exact amount of carbon containing material necessary will depend upon its ash content and the richness of the phosphate rock. In this case there will be some variation in the amount of carbon monoxide formed, but care should be taken to limit the amount of oxygen admitted and so to carry on the combustion as to prevent the extensive formation of $CO_2$. There will also be some nitrogen mixed with the resulting vapors.

If the phosphate rock were simply heated with the carbon the desired vapors and gases would be obtained, but the residual slag would be valueless. When silica and alumina are added these ingredients will combine with the calcium liberated by the evolution of phosphorus and give a slag having the composition of quick-setting cement so that a valuable residue is obtained at very little additional cost.

The question of which procedure to follow will ordinarily depend on the market conditions affecting the costs of raw materials (sulphuric acid or bauxite) and the value of the products (calcium sulphate and active carbon, or aluminum-silica cement). If desired, other methods of obtaining crude phosphoric acid from the phosphate rock may be used as is well known in the art.

It has been known for many years that phosphorus can be treated with steam to form phosphoric acid and hydrogen. However, unless a very high temperature (above 800° C.) is used, the production of phosphoric acid by this method is impractical owing to the formation of hydrogen phosphides. This high temperature has many disadvantages and for the purposes of the present process is quite impractical, for the same temperature used to cause an evolution of hydrogen will cause the carbon-monoxide to be further oxidized and rendered valueless.

I have discovered that the desired reaction between the phosphorus and steam can be carried on commercially below the temperature at which the carbon-monoxide is further oxidized, if the reaction is caused to take place in the presence of absorptive carbon such for example as that obtained in example 1 above. A catalyst in the gaseous or vapor stage also should be used.

The absorptive carbon apparently serves as a catalyst so that the desired reaction will take place at as low a temperature as 350° C. but if a higher temperature is used the reaction is accelerated. For example, at 700° C. the reaction will be quite rapid while less than 1% of the carbon-monoxide will be consumed. In any event, the top limit is that at which the active carbon will ignite. The use of the absorptive carbon further provides a ready means of separating out the phosphoric acid which will be held as metaphosphoric acid in the carbon from which it may readily be washed out.

As regards the catalyst for the oxidation of the phosphorus by steam it is known that metallic substances can be used, but I have discovered that non-metallic substances have a strong catalytic action when used in conjunction with the absorptive carbon. For example, one can easily and advantageously use a very small amount (1 part to a thousand parts of phosphorus vapor) of a halogen or a halogen compound such as hydrochloric acid.

In practice, I find it advantageous to take the vapors as they come from one of the types of furnace or retort used in the first phase, add an excess of steam and the gaseous catalyst, and pass the mixture through an absorber containing the active carbon. This may be heated to say 350° C. to start the reaction but as the reaction is exothermic, it may be found necessary to cool the gas mixture to prevent the temperature in the absorber from rising too high. For continuous operation, two absorbers may be used so that when one is saturated by phosphoric acid the other may be connected to the gas supply while the first is being washed with water to remove the phosphoric acid which is retained in the carbon. The acid thus obtained will be technically pure so that it may be used for example in the manufacture of ammonium phosphate.

I have found that for each kilogram of phosphorus that was present about 1800 litres of hydrogen will be released, and since the carbon-monoxide has not been consumed the resulting gas mixture will be well adapted for many synthetic processes.

If one desires to obtain the hydrogen and carbon-monoxide separately, the vapors from the furnace or retort can be passed through a bed of active carbon which will absorb the phosphorus vapors, so that the carbon-monoxide may be collected and used as desired. The steam and catalyst may then be passed into the impregnated carbon so that the phosphorus is converted into metaphosphoric acid and hydrogen liberated. Any excess steam together with the catalyst can be condensed, leaving the hydrogen substantially pure. This hydrogen may be caused to combine with atmospheric nitrogen by any appropriate process to produce ammonia, which in turn may be passed through the phosphoric acid washed from the carbon giving a yield of ammonium phosphate.

In other words, I may start with phosphate rock, ordinary carbon containing material such as peat, sawdust, charcoal etc., air and steam together with either sulphuric acid or alumina and silica and produce calcium sulphate and active carbon or quick-setting cement, methanol, ammonia, ammonium phosphate and pure phosphoric acid as well as other synthetic products, with no other waste products to be disposed of.

What I claim is:

The process of converting phosphorus into phosphoric acid, which comprises the step of causing the phosphorus to react with steam mixed with a halogen containing substance as a catalyst in the presence of absorptive carbon at a temperature above 300° and below the combustion point of the carbon, whereby hydrogen is evolved and metaphosphoric acid is obtained absorbed in the carbon.

EDOUARD URBAIN.